W. R. CORY.
Harvester.
No. 110,742. Patented Jan'y 3, 1871.
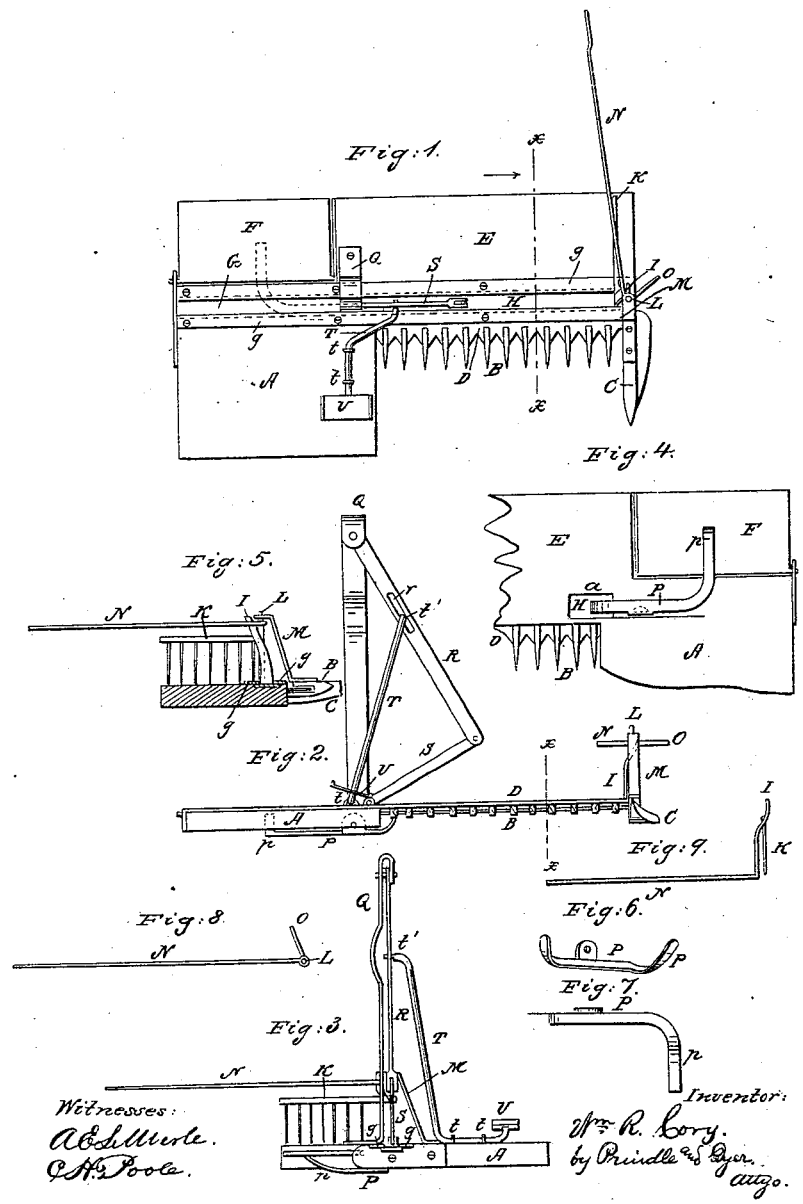

United States Patent Office.

WILLIAM ROBERT CORY, OF SPRINGFIELD, ILLINOIS.

Letters Patent No. 110,742, dated January 3, 1871.

IMPROVEMENT IN HARVESTERS.

The Schedule referred to in these Letters Patent and making part of the same.

*To all whom it may concern:*

Be it known that I, WILLIAM ROBERT CORY, of Springfield, in the county of Sangamon and in the State of Illinois, have invented certain new and useful Improvements in Harvesters; and do hereby declare that the following is a full, clear, and exact description thereof, reference being had to the accompanying drawing making a part of this specification, in which—

Figure 1 is a plan view of the cutting apparatus of a reaper with my improvements attached thereto;

Figures 2 and 3 are a front and an end elevation, respectively, of the same;

Figure 4 is a plan view of the lower side of the dropper;

Figure 5 is a vertical cross-section on the line $x\,x$ of figs. 1 and 2;

Figures 6 and 7 are, respectively, a rear elevation and a plan view of the lever for operating the dropper;

Figure 8 is a plan view of the cut-off bar used for arresting the falling grain while the dropper is being operated; and Figure 9 is a front elevation of the slide and lever for operating the sweep, dropper, lever, and cut-off.

Letters of like name and kind refer to like parts in each of the figures.

My invention is an improvement in dropping-attachments for reaping-machines; and It consists, principally, in the devices used for operating the dropper, substantially as is hereinafter set forth.

It also consists in the construction and arrangement of the sweep and its operating mechanism, substantially as is hereinafter shown.

It finally consists in the construction of the cut-off bar, and in the devices employed for operating the same, substantially as is hereinafter specified.

In the annexed drawing—

A represents the platform or frame;

B, the finger-bar;

C, the divider; and

D, the cutter of an ordinary reaper.

Immediately in rear of the cutting devices is secured a horizontal platform, E, having a width about equal to the average length of cut grain, for the reception of which it is intended.

The outer end of said platform E corresponds in lateral position with and is attached to the rear end of the divider C, while its opposite end extends inward somewhat beyond the corresponding end of the cutter-bar, from which point to the opposite side of the frame A extends a drop, F, having a width corresponding to that of said platform, and being hinged at its front side to said frame, so as to be capable of tilting downward to the rear.

Immediately in rear of the finger-bar B is a groove, G, cut within the surface of the platform E, and partially inclosed upon its upper side by means of two metal plates, $g$, which are secured upon said platform, so as to project therefrom over each side of said groove, and form a way for the reception of a slide, H.

As seen in figs. 3 and 9, the slide H is formed of a rectangular bar of metal, corresponding in size and shape with the groove G, and having a length about equal to that of the cutter-bar.

Attached to and projecting upward from the outer end of said slide is a bar, I, which serves as a support for a sweep, K, that from thence extends rearward across the platform E.

The sweep K is formed, like an ordinary rake, of a series of teeth, arranged within a suitable head, and so adjusted as that the lower or free ends of said teeth shall bear lightly upon said platform E, so that, if the slide H and said sweep be caused to move from the outer end of the groove G toward the drop F, any grain that may have fallen upon said platform will be carried to and deposited upon said drop.

In order that grain may be prevented from falling upon the platform while the sweep is being operated, the following-described means is employed:

A short shaft, L, is pivoted, in a vertical position, within and between the divider C and a standard, M, that is secured to and projects upward from said divider.

A bar, N, having a length somewhat greater than that of the finger-bar, is secured at one end within the upper end of the shaft L, and from thence extends horizontally outward, so that, when swung around parallel with the cutting devices, said bar shall be in a position to receive and support the falling grain.

The upper end of the bar I extends upward beyond the cut-off bar, and, bearing against its rear side, holds it shut when the slide is in any other position than at the outer end of its stroke, at which point said bar I, coming in contact with a short arm, O, projecting outward from the shaft L at a right angle with said cut-off bar N, throws the latter to the rear, and permits the free admission of grain to the platform.

The drop F is held in a horizontal position, and tilted downward to the rear by means of a lever, P, which is pivoted immediately beneath and parallel with the groove G, and is provided at one end with an arm, $p$, that extends rearward beneath said drop, while its opposite end passes upward through a suitable opening, $a$, into said groove G, and bears against the lower side of the slide-bar H.

As thus arranged, the drop rests upon and is supported by means of the end $p$ of the lever P so long as the opposite end of said lever bears against the slide-bar H; but when said slide-bar is moved across, so as to bring the sweep to the inner end of its stroke, it uncovers the slot or opening $a$, and permits the end of said lever contained therein to rise, by which means its corresponding end is depressed, and the dropper tilted. Upon being moved backward or outward, the slide presses downward upon the lever P, and at once raises the dropper.

In order to permit the dropping devices to be operated at will, a standard, Q, is secured to and extends upward from the platform E, near the dropper F, and has pivoted within its upper end one end of a lever, R, that from thence extends downward, and is connected with the inner end of the slide-bar H by means of a short connection, S, pivoted to both lever and slide-bar.

A rod, T, is journaled within suitable bearings, t, secured to or upon the platform A, and from thence, extending upward and rearward in a line with the standard Q, terminates in a short horizontal arm, t', that passes into a longitudinal slot, r, formed within the lever R.

The forward end of the rod T projects upward, and has secured thereon a cross-piece, U, for the reception of the feet of the operator.

As thus arranged, by pressing downward alternately upon opposite ends of the foot-piece U, the rod T has its upper end thrown from side to side, so as to operate the lever R, and through it the sweep, cut-off, and dropper.

In use, the devices are arranged as shown in figs. 1 and 2, so as to permit grain to fall upon the platform as it is cut until a sufficient quantity is lodged thereon to form a sheaf, when, by a slight pressure of his foot, the operator closes the cut-off, sweeps the grain upon the drop, and deposits it upon the ground, after which pressure upon the opposite end of the foot-piece restores said parts to their former positions.

Having thus fully set forth the nature and merits of my invention,

What I claim as new is—

1. In combination with the dropper F, the means employed for tilting the same, consisting of the lever P and slide H, constructed and arranged substantially as and for the purpose shown.

2. In combination with the above, the sweep K and arm I for operating the same, substantially as specified.

3. In combination with the cut-off bar N, pivoted to or upon the shaft L, the arm I of the slide H, and arm O, attached to said shaft L, substantially as and for the purpose described.

4. In combination with the slide H, dropper F, sweep K, and cut-off N, the lever R, provided with the slot r, the connection S, the rod T, and the foot-piece U, substantially as and for the purpose set forth.

In testimony that I claim the foregoing I have hereunto set my hand this 29th day of October, 1870.

WM. ROBERT CORY.

Witnesses:
  C. S. ZANE,
  ISAAC A. HAWLEY.